June 17, 1958  H. M. TOWNSEND  2,838,988
AUTOMOBILE VENTILATOR
Filed May 17, 1954  3 Sheets-Sheet 1

INVENTOR
Harry M. Townsend
BY Paul Fitzpatrick
ATTORNEY

June 17, 1958  H. M. TOWNSEND  2,838,988
AUTOMOBILE VENTILATOR
Filed May 17, 1954  3 Sheets-Sheet 2
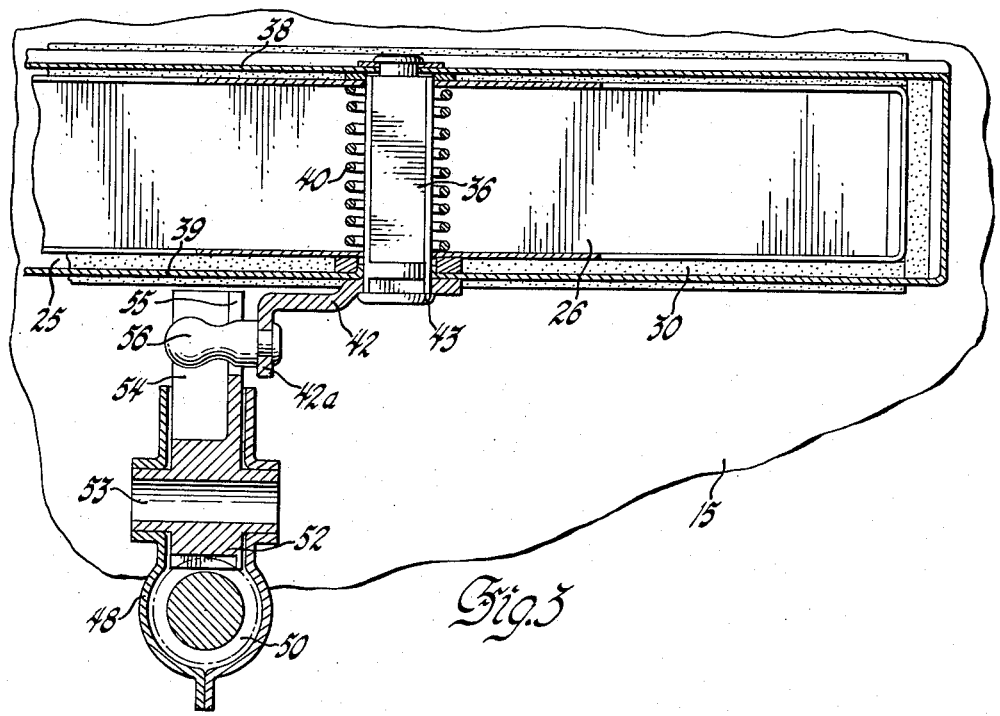
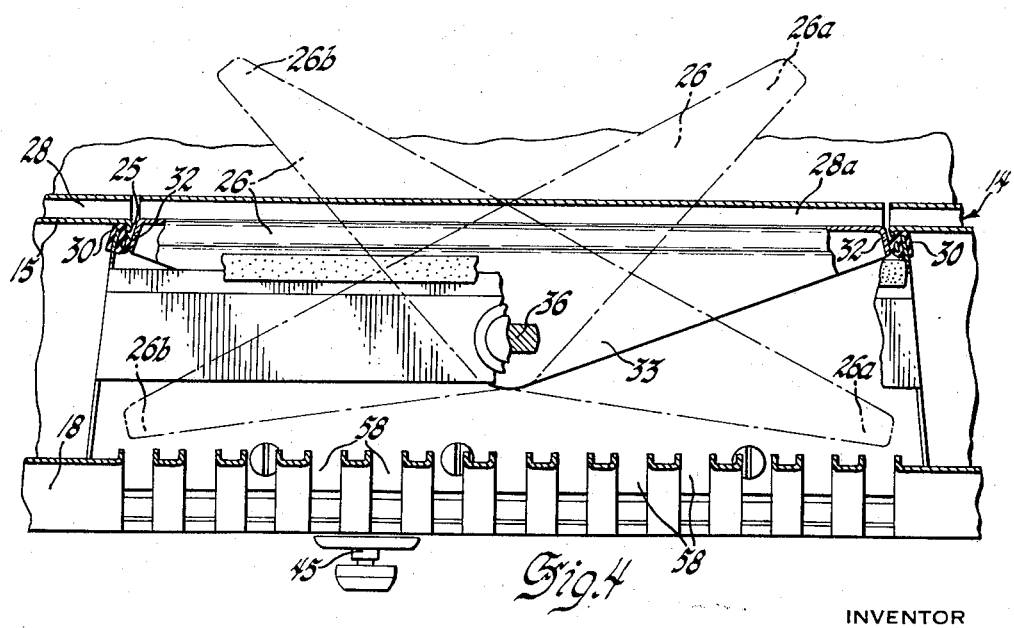
INVENTOR
Harry M. Townsend
BY
Paul Fitzpatrick
ATTORNEY June 17, 1958  H. M. TOWNSEND  2,838,988
AUTOMOBILE VENTILATOR
Filed May 17, 1954  3 Sheets-Sheet 3

INVENTOR
Harry M. Townsend
BY
Paul Fitzpatrick
ATTORNEY

United States Patent Office 2,838,988
Patented June 17, 1958

2,838,988
AUTOMOBILE VENTILATOR

Harry M. Townsend, Detroit, Mich., assignor to General Motors Corporation, Detroit, Mich., a corporation of Delaware Application May 17, 1954, Serial No. 430,156

4 Claims. (Cl. 98—2)

This invention relates to ventilating apparatus, and more particularly to apparatus for ventilating a vehicle.

In most modern automobiles, the front door is provided with a main window which is slidable between open and closed positions and with a forwardly located pivoted window commonly known as a "CV" window. The CV window is pivoted about a vertical axis so that its forward edge may be swung inwardly and its rear edge may be swung outwardly to create a suction effect and exhaust air from inside the vehicle body. The CV window usually is operated either through a crank and gear box or by a simple friction holding arrangement, although power operation is sometimes employed.

Present styling developments, including substantially vertical side windshield pillars in combination with wraparound or panoramic windshields, have resulted in an effect generally detracting from the desired attractive appearance of the CV window. Before the advent of vertical windshield pillars, the CV window was generally triangular in shape, having an oblique forward edge. However, when a wrap-around windshield is used, the CV window cannot be triangular, but must be in the form of a rectangle, and in some instances where the windshield side pillar is not vertical but leans forwardly, the CV window is trapezoidal in shape.

This invention relates to a novel ventilating device which may be used to supplement the CV window if desired or which may entirely replace the CV window if the overall styling of the automobile dictates that the CV window be eliminated. According to the invention, a portion of the door outer panel just below the belt line is pivotally mounted so that it can be swung to selected ventilating positions by operating means inside the vehicle. When in closed position, the ventilator lies in the plane of the door outer panel, and it can be pivoted in one direction so that its forward edge is outboard of the vehicle to provide an air scoop, or it can be pivoted in the opposite direction so that its rear edge is outboard of the vehicle to exhaust inside air in the manner of the conventionally used CV window.

Other features and advantages of the invention will be apparent from the following descrption and from the drawings, in which:

Fig. 3 is a section taken at right angles to Fig. 2, along the line 3—3 of Fig. 2;

Fig. 4 is an enlarged horizontal longitudinal section through a portion of the door taken along the line 4—4 of Fig. 1, the ventilator being shown closed in solid lines and open in broken lines;

Figure 1:
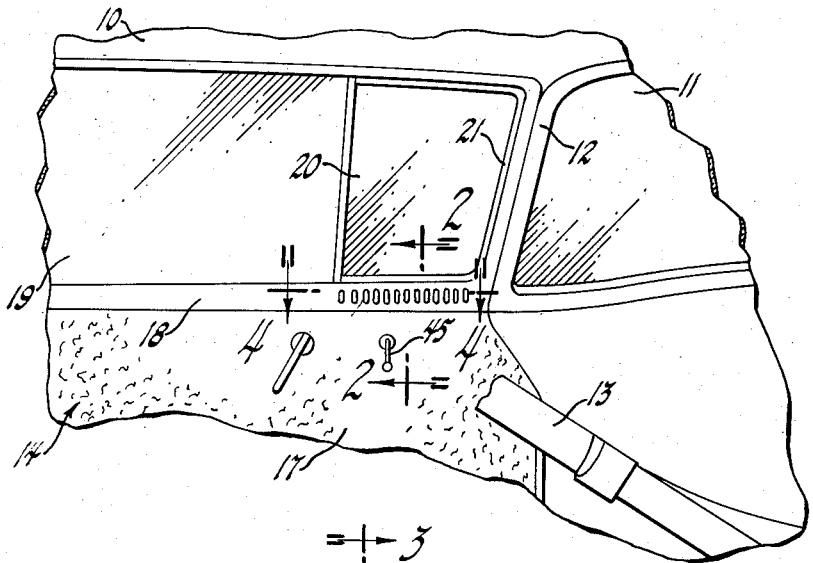
Fig. 1 is a fragmentary side elevational view of one front door and the windshield of an automobile, looking from inside the body.

Referring now more particularly to the drawings, the ventilator is illustrated installed in an automobile having a body including a roof 10 and a windshield 11 framed by the roof and by a substantially vertical side windshield pillar 12. 13 is the steering post on the driver's side of the passenger compartment. The body includes a front door designated generally as 14 and comprising an outer door panel 15 and an inner door panel 16 spaced from the outer panel. The exposed surface of the inner panel 16 is covered with upholstery or trim 17 capped by a garnish molding trim strip 18.

The door is provided with a main window 19 which is slidably movable between the closed position illustrated in Fig. 1 and a lowered or open position wherein the window is housed between the inner and outer panels 15, 16. Forwardly of the main window there is a CV window 20. In the automobile illustrated window 20 is not movable, but is permanently closed, being sealed by a sealing strip 21 extending entirely around its periphery, but if desired the CV window might be made movable about a vertical axis in conventional manner. Below the false CV window 20, the door outer panel is formed with a ventilating opening 25 and a shutter member 26 is mounted in this opening for pivotal movement selectively in either of two opposite directions. In the automobile illustrated, there is a trim strip 28 on the door outer panel 15, and, as shown in Figs. 2 and 4, a separate section 28a of this trim strip is carried across the shutter 26.

The ventilating opening 25 is framed by a rubber weatherstrip 30 against which in-turned flanges on the shutter 26 seal when the shutter is in closed position. As shown in Fig. 4, the shutter has relatively short end flanges 32 for sealing against the weatherstrip and, as shown in Fig. 2, the shutter has a relatively long upper side flange 33 and a relatively long lower side flange 34 which extend inwardly past the weatherstrip 30. A pin 36 is journaled in brackets 38 and 39 in the space between the outer and inner panels 15 and 16, and the shutter 26 is nonrotatably mounted on said pin for pivotal movement in opposite directions about the vertical axis of the pin 36. As shown in Fig. 4, the pin is generally rectangular in transverse section. A compression spring 40 on the pin 36 seats against the upper and lower flanges 34 of the shutter, providing an anti-rattle device and an arm 42 is nonrotatably mounted on the pin at the lower end thereof, the arm seating on the peened lower end 43 of the pin and projecting rearwardly in the space between the panels 15 and 16.

The operating means for pivoting the shutter includes a crank handle 45 on a crank shaft 46 which extends from inside the body through respective openings in the inner panel 16 and upholstery material 17, and which is rotatably supported in a gear box 48. A worm gear 50 is pinned to shaft 46 and meshes with a gear 52 which is pinned to a shaft 53 in the box 48. From shaft 53 there extends a lever 54 having a slot 55 in its free end, and a movable connection is made between the lever 54 and the arm 42 by means of a ball stud 56 which projects from a turned flange 43a (Fig. 3) on the arm 42 and which seats in the slot 55.

Figure 2:
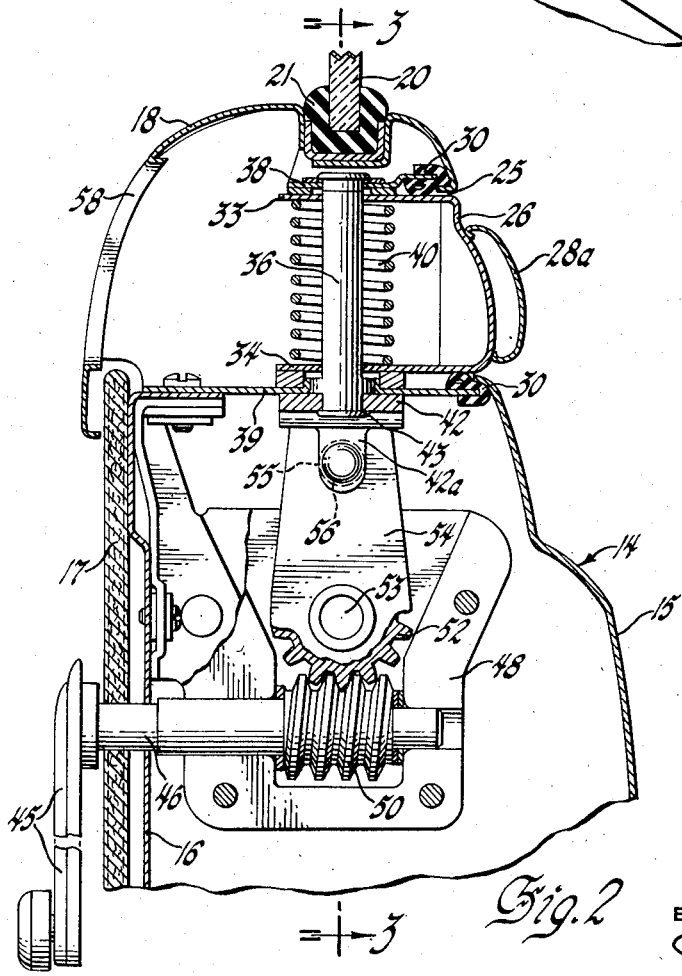
Fig. 2 is an enlarged vertical transverse section through a portion of the door, being taken along the line 2—2 of Fig. 1.

When the shutter 26 is in closed position as shown in Fig. 2 and as shown in solid lines in Fig. 4, it lies in the plane of the door outer panel 15. Upon turning the crank 45 in one direction, the shutter may be pivoted so that its forward end 26a lies outboard of the automobile body as shown in broken lines in Fig. 4. In this position, the ventilator acts as an air scoop, drawing outside air inside the body of the automobile. As shown in Figs. 1, 2 and 4, the garnish molding 18 is louvered, having a plurality of openings 58 located opposite the ventilator opening 25 in the outer panel 15 so that air is directed by the inclined shutter toward the openings 58. By turning the crank in the other direction, the shutter may be pivoted in the opposite direction so that its rear end 26b is outboard of the vehicle as shown in broken lines in Fig. 4. When in this position, the shutter acts to exhaust air from the vehicle in the same manner as a conventional CV window.

Figure 5:
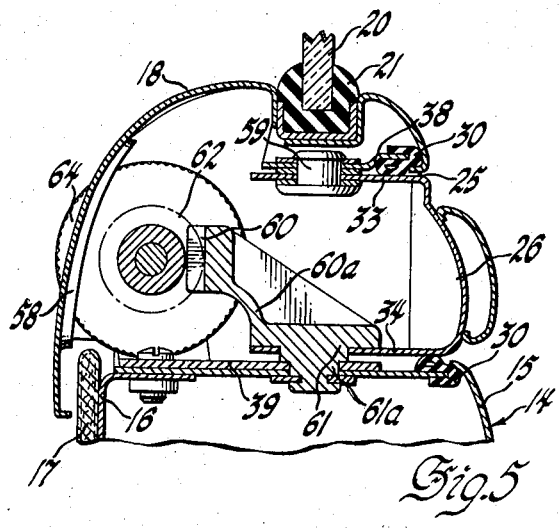
Fig. 5 is a fragmentary section similar to a portion of Fig. 2, but showing a modified form of operating means.
Figure 6:
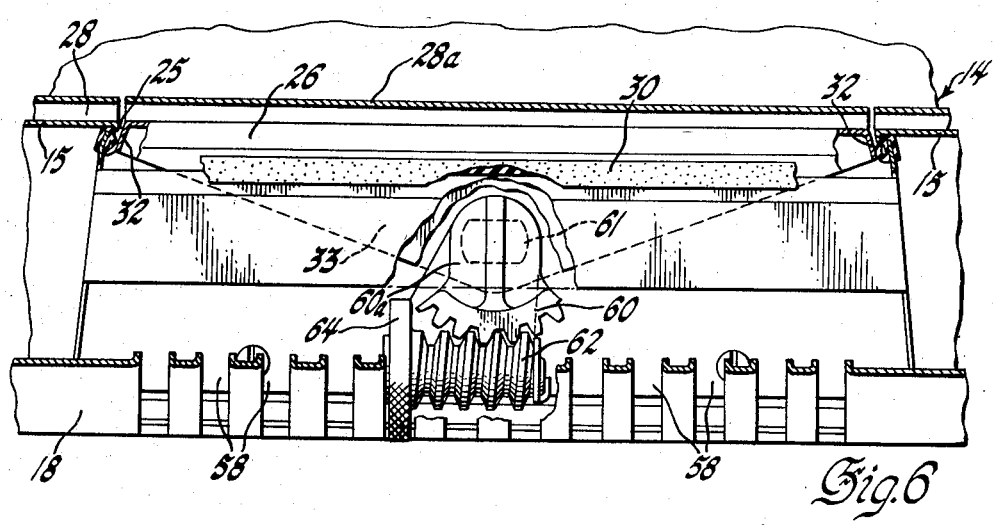
Fig. 6 is a horizontal section similar to Fig. 4, but including the modification shown in Fig. 5.

Figs. 5 and 6 show a modified form of operating means. In this form of the invention, the pin 36 is omitted and the shutter 26 is mounted for pivotal movement by means of individual bearing devices at the top and bottom flanges 33 and 34. For mounting the top flange there is a bearing stud 59 extending through the top flange 33 of the shutter member and extending through the bracket 38. At the bottom there is a gear sector 60 having an integral mounting arm 60a with a downwardly projecting rectangular shank portion 61 upon which the lower flange 34 of the shutter member 26 is non-rotatably mounted. The lower end of the shank 61 is formed as a circular (in transverse section) bearing stud 61a journaled in an opening in support bracket 39 to provide for pivotal movement of gear sector 60 and shutter 26. Gear sector 60 meshes with a worm 62 mounted in the space between the inner and outer panels 15 and 16 with its axis parallel to the inner panel 16. A thumb wheel 64 is connected to the worm 62 and a portion of the periphery of the thumb wheel extends through one of the louver openings 58 as shown in Fig. 5. The thumb wheel, which preferably has a knurled periphery, may be turned by a passenger in the car to pivot the shutter between its closed position in the plane of the body panel and either open position illustrated in Fig 4.

While I have shown and described two embodiments of my invention, it is capable of many modifications. Changes, therefore, in the construction and arrangement may be made without departing from the spirit and scope of the invention as set forth in the appended claims.

I claim:

1. In a vehicle, ventilating apparatus of the character described, including; an outer body panel having a ventilating opening therein facing in a generally vertical plane; a shutter for closing the ventilating opening; means for mounting said shutter intermediate its ends on a vertical axis spaced inwardly from the body panel for pivotal movement selectively in either of two opposite directions; an arm mounted at said axis for pivotal movement with said shutter about said axis and extending in a direction generally parallel to the plane of the shutter to a location at one side of said axis; an oscillatable lever; means providing a bodily movable connection between said lever and arm; and operating means inside the vehicle for oscillating said lever to pivot said shutter between a closed position in which it covers said ventilating opening and a selected open position.

2. In an automobile, ventilating apparatus of the character described, including: a door having an outer panel with a ventilating opening facing in a generally vertical plane, said door having an inner surface formed from an inner panel spaced from said outer panel and a garnish molding member having a portion extending opposite said ventilating opening and spaced therefrom, the garnish molding member having at least one opening located opposite said ventilating opening; a shutter for closing the ventilating opening; means for mounting said shutter intermediate its ends on the door on a vertical axis spaced inwardly from said outer panel for pivotal movement selectively in either of two opposite directions; actuating means mounted in the space between the outer panel and the inner panel and garnish molding member, including an arm mounted for pivotal movement with said shutter about said axis, an oscillatable lever and means providing a bodily movable connection between said lever and arm; and operating means inside the automobile for oscillating said lever to pivot said shutter between a closed position in which it covers said ventilating opening and a selected open position.

3. Apparatus of the character claimed in claim 2, wherein the means providing a bodily movable connection between the lever and arm comprises a slot in one and a ball on the other seating in said slot.

4. In an automobile, ventilating apparatus of the character described, including: a door having an outer panel with a ventilating opening facing in a generally vertical plane, said door having an inner surface formed from an inner panel spaced from said outer panel and a garnish molding member having a portion extending opposite said ventilating opening and spaced therefrom, the garnish molding member having louvers located opposite said ventilating opening; a shutter for closing said ventilating opening; means for mounting said shutter substantially midway intermediate its ends on the door on a vertical axis for pivotal movement selectively in either of two opposite directions; actuating means mounted in the space between the outer panel and the inner panel and garnish molding member, including an arm mounted for pivotal movement with said shutter about said axis, an oscillatable lever and a ball and slot providing a bodily movable connection between said lever and arm; and operating means inside the vehicle comprising a crank and gear means for oscillatiing said lever to pivot said shutter between a closed position in which it covers said ventilating opening and a selected open position.

References Cited in the file of this patent

UNITED STATES PATENTS

| | | |
|---|---|---|
| 1,128,414 | Coleman | Feb. 16, 1915 |
| 1,260,536 | Hedges | Mar. 26, 1918 |
| 1,406,198 | Longenbaugh | Feb. 14, 1922 |
| 1,480,274 | La Barre | June 8, 1924 |
| 1,712,180 | Townsend | May 7, 1929 |
| 1,729,036 | Elliott | Sept. 24, 1929 |
| 1,971,360 | Watson | Aug. 28, 1934 |
| 2,020,370 | Moog et al. | Nov. 12, 1935 |
| 2,070,113 | Burgess | Feb. 9, 1937 |
| 2,096,556 | Morrison | Oct. 19, 1937 |
| 2,159,516 | Ball | May 23, 1939 |
| 2,164,342 | Morrison | July 4, 1939 |
| 2,202,703 | Lintern | May 28, 1940 |
| 2,372,164 | Woodhams | Mar. 20, 1945 |
| 2,463,715 | Randall | Mar. 8, 1949 |